US008914482B2

(12) United States Patent
Petushkov et al.

(10) Patent No.: US 8,914,482 B2
(45) Date of Patent: Dec. 16, 2014

(54) TRANSLATION OF TECHNOLOGY-AGNOSTIC MANAGEMENT COMMANDS INTO MULTIPLE MANAGEMENT PROTOCOLS

(75) Inventors: Denis Petushkov, Sammamish, WA (US); Michael E. Brasher, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 12/787,407

(22) Filed: May 26, 2010

(65) Prior Publication Data
US 2011/0295987 A1   Dec. 1, 2011

(51) Int. Cl.
G06F 15/173   (2006.01)
H04L 12/24   (2006.01)

(52) U.S. Cl.
CPC ................................. H04L 41/0226 (2013.01)
USPC .......................................... 709/223; 709/246

(58) Field of Classification Search
CPC .................................................. H04L 41/0226
USPC ................................................. 709/223, 246
See application file for complete search history.

(56) References Cited

U.S. PATENT DOCUMENTS

| | | | |
|---|---|---|---|
| 6,253,257 B1 | 6/2001 | Dundon | |
| 6,862,736 B2* | 3/2005 | Hudis et al. | 719/316 |
| 6,971,090 B1* | 11/2005 | Gruttadauria et al. | 717/136 |
| 7,624,116 B2* | 11/2009 | Yin et al. | 1/1 |
| 8,429,261 B2* | 4/2013 | Bhattacharjee et al. | 709/223 |
| 2005/0027871 A1 | 2/2005 | Bradley et al. | |
| 2008/0263194 A1 | 10/2008 | Choi et al. | |
| 2009/0199112 A1 | 8/2009 | DeSerranno | |
| 2010/0115076 A1* | 5/2010 | Bhattacharjee et al. | 709/223 |
| 2010/0281101 A1* | 11/2010 | Kirvan et al. | 709/203 |

OTHER PUBLICATIONS

Oracle.com. "Chapter 2—Using Solaris WBEM Services in WDR." Retrieved from the Internet on Jan. 30, 2013. Copyright 2002. >URL: http://docs.oracle.com/cd/E19683-01/816-1984-11/cim_tools.html>.*
Harrison, Brian. "WMI Mapper: Accessing WMI data using CIM XML." Retrieved from the Internet on Jan. 29, 2013. Copyright 2003 Global Management Conference.*
Kovari, et al., "WebSphere and .NET CoexistenceWSIF", Retrieved at << http://www.redbooks.ibm.com/redbooks/pdfs/sg247027.pdf >>, Mar. 2004, pp. 612.
Rzeszutek, Konrad., "System Management Using WBEM", Retrieved at << http://sblim.sourceforge.net/doc/LWE-2005-02-WBEMSystemMgmt.pdf >>, Mar. 6, 2007, pp. 1-91.
"WSIF: Web Services Invocation Framework", Retrieved at << http://svn.apache.org/repos/asf/webservices/wsif/tags/pre1_2_0/java/readme.htm >>, Retrieved Date: Mar. 17, 2010, pp. 3.
Vincent, Chip., "CMPI Provider Test Harness", Retrieved at << http://www.mandevcon.com/2008/track_developer.html >>, Nov. 17-20, 2008, pp. 4.

* cited by examiner

*Primary Examiner* — Mohamed Wasel
(74) *Attorney, Agent, or Firm* — Jim Sfekas; Kate Drakos; Micky Minhas (57) ABSTRACT

Methods, systems, and computer-readable media to translate technology agnostic management commands into multiple management protocols are disclosed. A method includes providing a software library that is includable in a web-based enterprise management (WBEM) application. The software library includes instructions executable by a computer to generate one or more classes. The instructions are also executable to bind a technology-agnostic WBEM command to one or more in a first management protocol. The instructions are further executable to bind the technology-agnostic WBEM command to one or more commands in a second management protocol that is different from the first management protocol.

20 Claims, 5 Drawing Sheets

TRANSLATION OF TECHNOLOGY-AGNOSTIC MANAGEMENT COMMANDS INTO MULTIPLE MANAGEMENT PROTOCOLS

BACKGROUND

It has become common for enterprises to deploy management servers. Management servers may be used to transmit commands to managed resources (e.g., processing resources and storage resources) at the enterprise. A management server can receive commands from a client application, thereby enabling the client application to manage resources via the management server. A management server is typically categorized based on the management protocol supported by the management server. Modern enterprises often have multiple management servers (e.g., one or more management servers for each management protocol supported within the enterprise). However, developing client applications that can communicate with multiple management servers using multiple management protocols may be a tedious and error-prone task. Furthermore, updating the client application may result in duplication of effort, because the update may involve making similar changes to multiple software modules of the client application (e.g., a software module for each management protocol).

SUMMARY

Translation of management commands into multiple management protocols is disclosed. A software library that abstracts the details of various management protocols (e.g., a windows management instrumentation (WMI) protocol and a common information model extensible markup language (CIM-XML) protocol) may be provided. The software library may be included in a client application to automatically generate classes (e.g., C++ classes) that translate web-based enterprise management (WBEM) operations into WMI and CIM-XML commands. Inclusion of the software library into a client application may save programmers time and may reduce duplication of effort. For example, programmers may write management applications in terms of technology-agnostic WBEM code and may access the software library to fill in protocol-specific details, instead of writing complicated branching code (e.g., "if (protocol==WMI) then . . . else if (protocol==CIM-XML then . . . "). Further, when the client application is updated, the updates may be made once to WBEM code instead of multiple times (e.g., once to WMI code and once to CIM-XML code).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a computer system includes a processor and a memory coupled to the processor. The memory stores a management application executable by the processor to generate technology-agnostic management commands to manage a plurality of computing devices. The plurality of computing devices includes a first computing device associated with a first management protocol and a second computing device associated with a second management protocol. The management application is also executable to load a technology abstraction library. The technology abstraction library is configured to generate one or more classes that are executable to translate the technology-agnostic management commands to the first management protocol and to the second management protocol.

In another particular embodiment, a computer-readable medium includes instructions, that when executed by the computer, cause the computer to load a technology abstraction library configured to generate one or more classes. The classes are executable to translate web-based enterprise management (WBEM) commands to a first management protocol and to a second management protocol. The instructions also cause the computer to generate a WBEM command during execution of a technology-agnostic management application. The instructions further cause the computer to translate, via the technology abstraction library, the WBEM command to the first management protocol to generate a first translated WBEM command, and to transmit the first translated WBEM command to a first storage device. The instructions cause the computer to translate, via the technology abstraction library, the WBEM command to the second management protocol to generate a second translated WBEM command and to transmit the second translated WBEM command to a second storage device.

In another particular embodiment, a method includes providing a software library that is includable in a technology-agnostic web-based enterprise management (WBEM) application. The software library includes instructions executable by a computer to generate one or more classes based on one or more managed object format (MOF) files associated with one or more computing devices. The instructions are also executable by the computer to bind a technology-agnostic WBEM command to one or more common information model extensible markup language (CIM-XML) commands corresponding to the WBEM operation. The instructions are further executable to bind the technology-agnostic WBEM command to one or more windows management instrumentation (WMI) commands corresponding to the WBEM operation.

Figure 1:
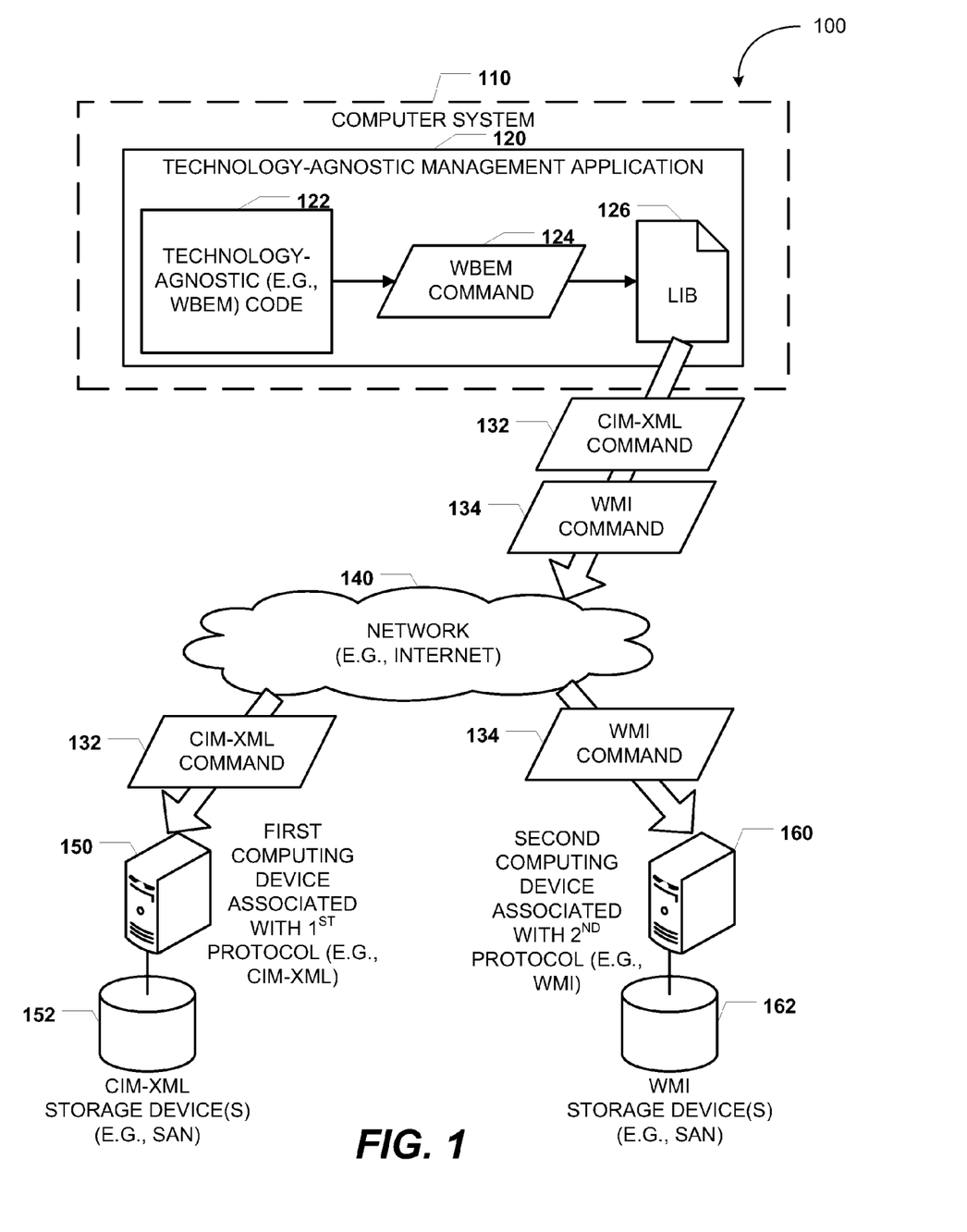
FIG. 1 is a diagram to illustrate a particular embodiment of a system of translating a technology-agnostic management command into multiple management protocols.

FIG. 1 is a diagram to illustrate a particular embodiment of a system 100 to translate a technology-agnostic management command into multiple management protocols. A computer system 110 is communicatively coupled to a first computing device 150 associated with a first management protocol (e.g., CIM-XML) and to a second computing device 160 associated with a second management protocol (e.g., WMI) that is different from the first management protocol. The computing devices 150 and 160 may be management servers configured to manage storage devices 152 and 162 (e.g., as part of one or more storage area networks (SANs)). It should be noted that although the embodiments herein are described with reference to CIM-XML and WMI, technology-agnostic management commands may be translated as disclosed herein into any management protocol. For example, technology-agnostic management commands may also be translated into the web services-management (WS-MAN) protocol.

The computer system 110 includes a technology-agnostic management application 120. For example, the technology-agnostic management application 120 may be a WBEM client that includes technology-agnostic (e.g., WBEM) code 122. In a particular embodiment, the code 122 is user code. In another particular embodiment, the technology-agnostic management application 120 may be a storage service configured to manage one or more SANs. During execution, the code 122 may generate a WBEM command 124. WBEM commands may be considered "technology-agnostic" since they do not include management protocol details (e.g., CIM-XML details or WMI details). Examples of WBEM commands include, but are not limited to, connect, enumerate, and associate.

The technology-agnostic management application 120 may also include a technology abstraction library 126. The technology abstraction library 126 is operable to convert the WBEM command 124 into a first management protocol (e.g., a CIM-XML command 132) and into a second management protocol (e.g., a WMI command 134). For example, the technology abstraction library 126 may include code that is executable to automatically generate software classes. The software classes may be executable to translate the WBEM command 124 into the CIM-XML command 132 or the WMI command 134. In a particular embodiment, the software classes are C++ classes. In another particular embodiment, the technology abstraction library 126 includes a CIM-XML dynamic object configured to communicate with CIM-XML devices (e.g., management servers) via hypertext transfer protocol (HTTP) and also includes a WMI dynamic object configured to communicate with WMI devices (e.g., management servers) via component object model (COM) or distributed COM (DCOM). In such an embodiment, the C++ classes generated by the technology abstraction library 126 may be configured to translate data into COM, DCOM, XML, or any combination thereof. It should be noted that although the particular embodiment illustrated in FIG. 1 illustrates translating a WBEM command into a single CIM-XML command and into a single WMI command, translating a particular WBEM command may instead result in multiple corresponding CIM-XML commands or WMI commands.

The first computing device 150 may be remote to the computer system 110 and may be associated with a first management protocol. In a particular embodiment, the first management protocol is CIM-XML and the first computing device 150 is a management server. For example, the first computing device 150 may be configured to manage the storage devices 152, where the storage devices 152 are part of a SAN that is manageable via CIM-XML commands. The first computing device 150 may be communicatively coupled to the computer system 110 via a network 140 (e.g., the Internet).

The second computing device 160 may be remote to the computer system 110 and may be associated with a second management protocol. In a particular embodiment, the second management protocol is WMI and the second computing device 160 is a management server. For example, the second computing device 160 may be configured to manage the storage devices 162, where the storage devices 162 are part of a SAN that is manageable via WMI commands. The second computing device 160 may be communicatively coupled to the computer system 110 via the network 140 (e.g., the Internet).

During operation, the technology-agnostic management application 120 may generate the WBEM command 124 during execution. The technology abstraction library 126 may be executed to generate software classes (e.g., C++ classes) that are operable to translate the WBEM command 124 into the CIM-XML command 132 or into the WMI command 134. The CIM-XML command 132 and the WMI command 134 may be transmitted to the first computing device 150 and the second computing device 160, respectively, via the network 140. In response to the CIM-XML command 132, the first computing device 150 may perform a management operation on the storage devices 152. In response to the WMI command 134, the second computing device 160 may perform the management operation on the storage devices 162.

It will be appreciated that the system 100 of FIG. 1 may enable users (e.g., software developers) to define management applications in general (e.g., technology-agnostic) terms since the system 100 supports a method of automatically converting management commands into specific management protocols.

Figure 2:
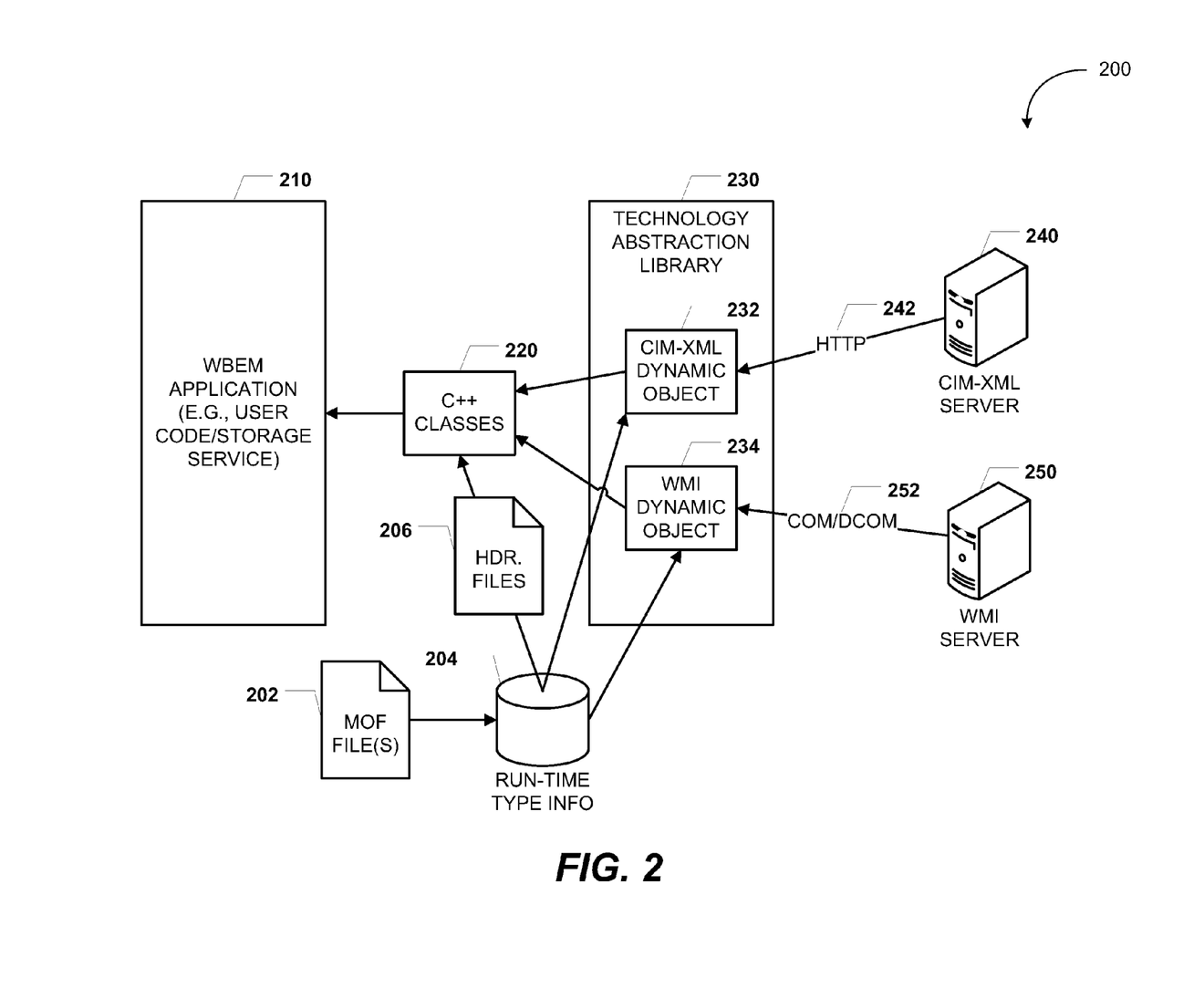
FIG. 2 is a diagram to illustrate another particular embodiment of a system of translating a technology-agnostic management command into multiple management protocols.

FIG. 2 is a diagram to illustrate another particular embodiment of a system 200 of translating a technology-agnostic management command into multiple management protocols. The system 200 includes a WBEM application 210 communicatively coupled to a CIM-XML server 240 and a WMI server 250. In an illustrative embodiment, the WBEM application 210 is the technology-agnostic management application 120 of FIG. 1, the CIM-XML server 240 is the first computing device 150 of FIG. 1, and the WMI server 250 is the second computing device 160 of FIG. 1.

The WBEM application 210 may include or have access to a technology abstraction library 230. In an illustrative embodiment, the technology abstraction library 230 is the technology abstraction library 126 of FIG. 1. The technology abstraction library 230 may be executable to generate C++ classes 220 that are useable by the WBEM application 210 to convert WBEM commands into CIM-XML commands and WMI commands. The technology abstraction library 230 may also include dynamic objects that are configured to communicate with the servers 240, 250. For example, the technology abstraction library 230 may include a CIM-XML dynamic object 232 configured to communicate with CIM-XML servers (e.g., the CIM-XML server 240) via HTTP and a WMI dynamic object 234 configured to communicate with WMI servers (e.g., the WMI server 250) via COM/DCOM.

The C++ classes 220 may be defined by header files (e.g., files with the ".h" extension) 206 that are includable in the WBEM application 210. The header files 206 may include software class and instance declarations associated with computing devices (e.g., the servers 240, 250). In a particular embodiment, the header files 206 are automatically generated based on run-time type information (RTTI) 204 associated with one or more managed object format (MOF) files 202. For example, the RTTI 204 is generated by a compiler (e.g., C++ compiler).

Thus, a software developer may leverage management protocol translation capabilities as disclosed herein by including the technology abstraction library 230 and the header files 206 in the WBEM application 210. During execution of the WBEM application 210, the technology abstraction library 230 may be loaded and executed to generate in-memory instances of the C++ classes 220, and the C++ classes 220 may be executed to translate WBEM commands into CIM-XML commands and WMI commands.

To illustrate, the MOF files 202 may include the following code associated with a particular computing device (e.g., one of the servers 240, 250):

```
class OperatingSystem
{
    [Key] String ComputerName;
    String OSName;
    String Version;
    void Reboot(Boolean force);
};
```

A WMI implementation of the WBEM enumerate command for the particular computing device may include:

```
//find WBEM locator object
CoCreateInstance( CLSID_WbemLocator, ..., (LPVOID*) &loc);
//connect to destination
loc->ConnectServer( "\\host\root\wmi", ..., &svcs);
//start enumeration
svcs->CreateInstanceEnum ("OperatingSystem",
WBEM_FLAG_DEEP, NULL, &en);
//retrieve instances
while (en->Next(..., &inst, ...) == WBEM_S_NO_ERROR)
{
    VARIANT var;
    inst->Get("ComputerName", var);
}
```

A CIM-XML implementation of the WBEM command for the particular computing device may include posting an HTTP request and parsing a resulting HTTP response, as follows:

```
<!--PostRequest-->
M-POST /cimom HTTP/1.1
73-CIMOperation: MethodCall
73-CIMMethod: EnumerateInstances
73-CIMObject: root/wmi
<?xml version="1.0" encoding="utf-8" ?>
<CIM CIMVERSION="2.0" DTDVERSION="2.0">
    <MESSAGE ID="87872" PROTOCOLVERSION="1.0">
        <SIMPLEREQ>
            <IMETHODCALL NAME="EnumerateInstances">
                <LOCALNAMESPACEPATH>
                    <NAMESPACE NAME="root"/>
                    <NAMESPACE NAME="wmi"/>
                </LOCALNAMESPACEPATH>
                <IPARAMVALUE NAME = "ClassName">
                    <CLASSNAME NAME="OperatingSystem"/>
                </IPARAMVALUE>
            </IMETHODCALL>
        </SIMPLEREQ>
    </MESSAGE>
</CIM>
<!--Parse Response-->
HTTP/1.1 200 OK
73-CIMOperation: MethodResponse
<?xml version="1.0" encoding="utf-8" ?>
<CIM CIMVERSION="2.0" DTDVERSION="2.0">
    <MESSAGE ID="87872" PROTOCOLVERSION="1.0">
        <SIMPLERSP>
            <IMETHODRESPONSE NAME="EnumerateInstances">
                <IRETURNVALUE>
                    <VALUE.NAMEDINSTANCE>
                        <INSTANCENAME CLASSNAME="OperatingSystem">
                            <PROPERTY NAME="ComputerName" TYPE="string">
                                <VALUE>
                                    my_favorite_computer
                                </VALUE>
                            </PROPERTY>
                            ...
                        </INSTANCENAME>
                    </VALUE.NAMEINSTANCE>
                </IRETURNVALUE>
            </IMETHODRESPONSE>
        </SIMPLERSP>
    </MESSAGE>
</CIM>
```

When the WBEM application 210 does not have access to the technology abstraction library 230, software developers of the WBEM application 210 may have to maintain both of the above code portions. However, when the WBEM application 210 has access to the technology abstraction library 230, software developers may instead include and manage the following C++ code in the WBEM application 210 (where the technology abstraction library 230 is the "concrete" library below):

```
concrete::Client cli;
vector< concrete::OperatingSystem > systems;
cli.connect( L"CIM-XML" /*L"WMI"*/ , L"host", L"root/wmi", ... );
concrete::Enumerate( cli, systems );
for ( unsigned int i = 0; i < systems.size( ); i++ )
{
    wcout << systems[i].ComputerName( ) << endl;
}
```

As indicated by the comment in the third line of code above, a software developer may simply substitute "WMI" for "CIM-XML," depending on whether the code is intended for WMI systems or CIM-XML systems. It will be appreciated that the reduced length and increased simplicity of such technology-agnostic code may be preferable to the previously described protocol-specific WMI and CIM-XML implementations. Thus, the technology abstraction library 230 may reduce application development time, increase code readability, and provide access to both WMI and CIM-XML servers (e.g., the servers 240, 250) with the same code. For example, when there is a change at the servers 240, 250 of FIG. 2, a software developer may update the technology-agnostic WBEM code above rather than updating both the WMI implementation and the CIM-XML implementation, thereby reducing duplication of effort.

Figure 3:
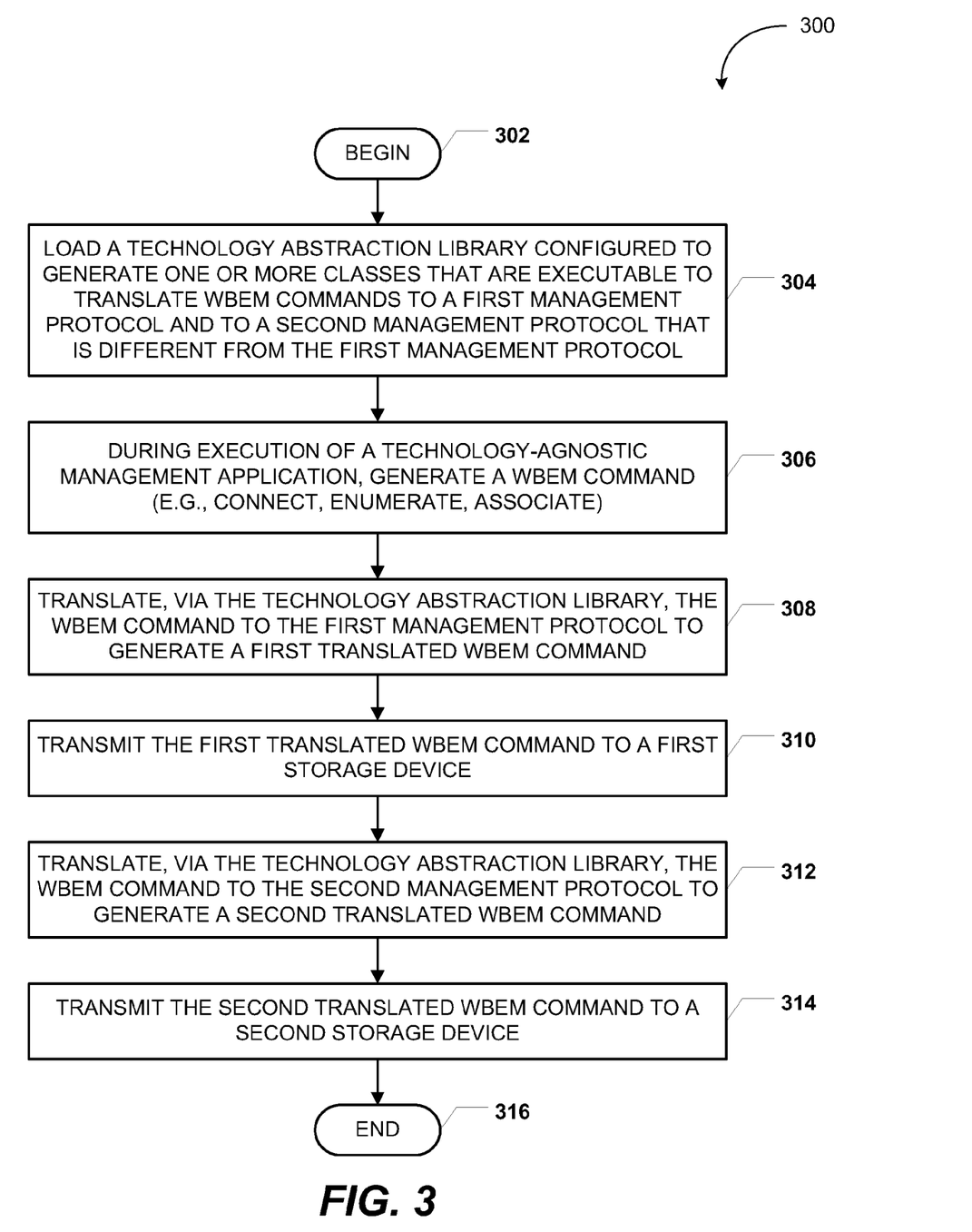
FIG. 3 is a flow diagram to illustrate a particular embodiment of a method of translating a technology-agnostic management command into multiple management protocols.

FIG. 3 is a flow diagram to illustrate a particular embodiment of a method 300 of translating a technology-agnostic management command into multiple management protocols. In an illustrative embodiment, the method 300 may be performed by the system 100 of FIG. 1 or the system 200 of FIG. 2.

The method 300 begins, at 302. The method 300 includes loading a technology abstraction library configured to generate one or more classes that are executable to translate WBEM commands to a first management protocol and to a second management protocol that is different from the first management protocol, at 304. For example, in FIG. 1, the library technology abstraction 126 may be loaded at the computer system 110 by the technology-agnostic management application 120.

The method 300 also includes, during execution of a technology-agnostic management application, generating a WBEM command, at 306. The WBEM command may be a connect command, an enumerate command, an associate command, or some other WBEM command. For example, in FIG. 1, the technology-agnostic management application 120 may generate the WBEM command 124.

The method 300 further includes translating, via the technology abstraction library, the WBEM command to the first management protocol to generate a first translated WBEM command, at 308. For example, in FIG. 1, the WBEM command may be translated into the CIM-XML command 132. The method includes transmitting the first translated WBEM command to a first storage device, at 310. For example, in FIG. 1, the CIM-XML command 132 may be transmitted to one of the CIM-XML storage devices 152 (e.g., via direct HTTP transmission or via the first computing device 150).

The method 300 also includes translating, via the technology abstraction library, the WBEM command to the second management protocol to generate a second translated WBEM command, at 312. For example, in FIG. 1, the WBEM command may be translated into the WMI command 134. The method includes transmitting the second translated WBEM command to a second storage device, at 314. For example, in FIG. 1, the WMI command 134 may be transmitted to one of the WMI storage devices 162 (e.g., via direct COM/DCOM transmission or via the second computing device 160). The method 300 ends, at 316.

Figure 4:
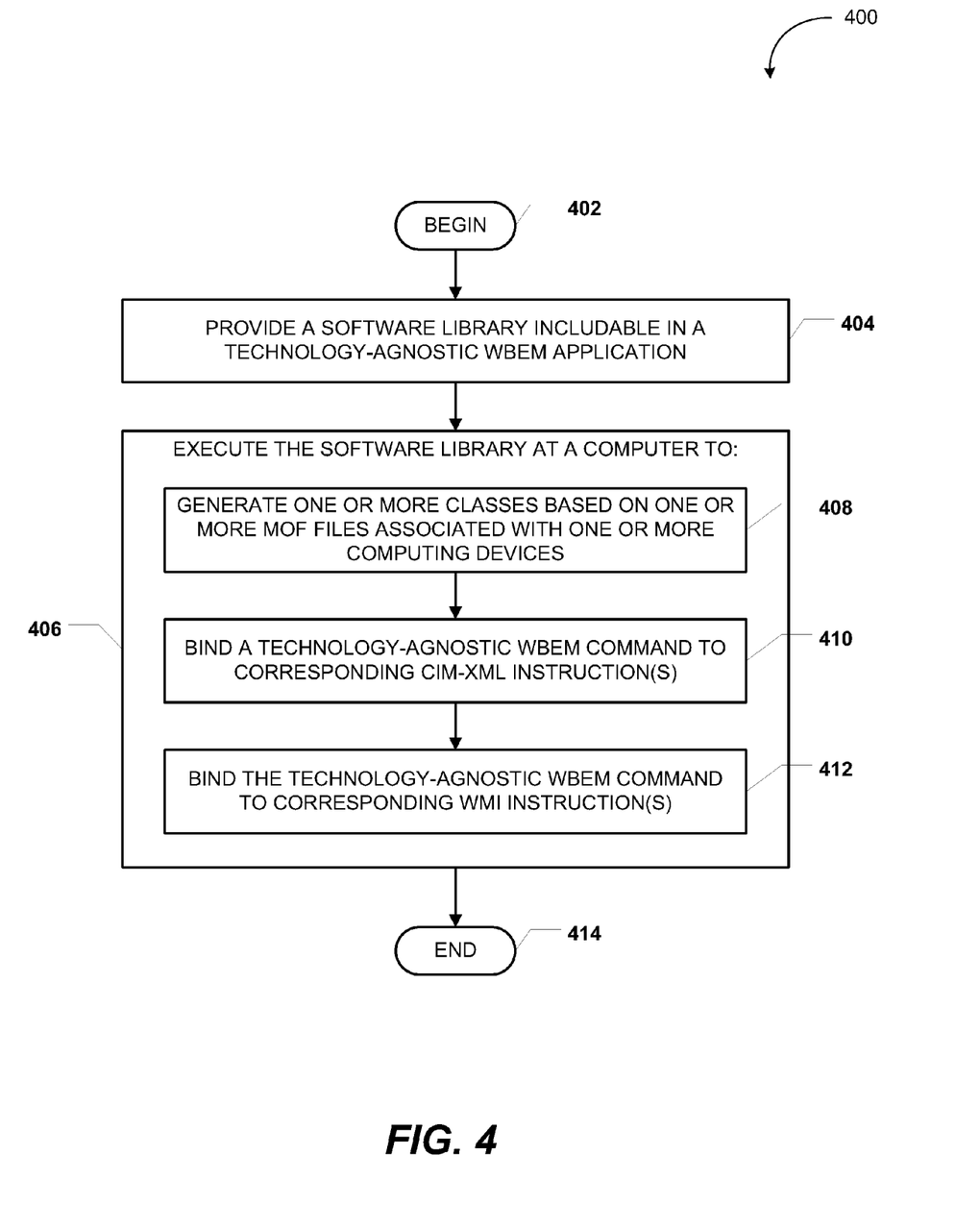
FIG. 4 is a flow diagram to illustrate another particular embodiment of a method of translating a technology-agnostic management command into multiple management protocols.

FIG. 4 is a flow diagram to illustrate another particular embodiment of a method 400 of translating a technology-agnostic management command into multiple management protocols. In an illustrative embodiment, the method 400 may be performed by the system 100 of FIG. 1 or the system 200 of FIG. 2.

The method 400 begins, at 402. The method includes providing a software library includable in a technology-agnostic WBEM application, at 404. For example, in FIG. 2, the technology abstraction library 230 may be provided to the WBEM application 210.

The method 400 includes executing the software library at a computer, at 406. Executing the software library includes generating one or more classes based on one or more managed object format (MOF) files associated with one or more computing devices, at 408. For example, in FIG. 2, the C++ classes 220 may be generated based on the MOF files 202.

Executing the software library also includes binding a technology-agnostic WBEM command into one or more corresponding CIM-XML instructions, at 410. For example, in FIG. 2, a WBEM command generated by the WBEM application 210 may be bound by the technology abstraction library 230 into CIM-XML instructions that are transmitted to the CIM-XML server 240.

Executing the software library also includes binding the technology-agnostic WBEM command into one or more corresponding WMI instructions, at 412. For example, in FIG. 2, the WBEM command generated by the WBEM application 210 may be bound by the technology abstraction library 230 into WMI instructions that are transmitted to the WMI server 250. The method 400 ends, at 414.

It will be appreciated that providing a technology abstraction library in accordance with the method 400 of FIG. 4 may simplify the creation of technology-agnostic (e.g., WBEM) code. WBEM code may be preferable to protocol-specific WMI and CIM-XML implementations. Thus, the method 400 of FIG. 4 may reduce management application development time, increase code readability, and provide access to management servers compatible with different management protocols using the same code.

Figure 5:
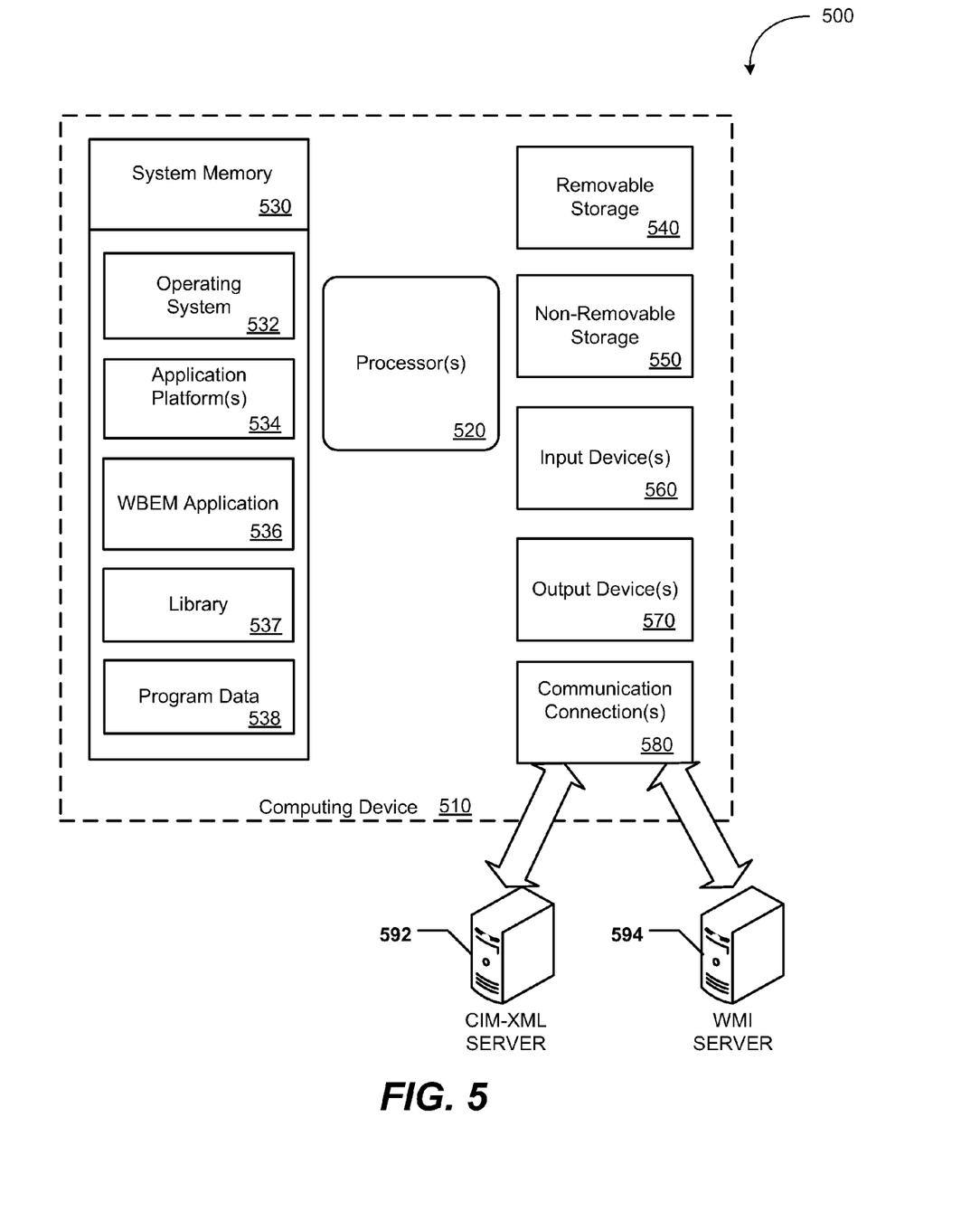
FIG. 5 is a block diagram of a computing environment including a computing device operable to support embodiments of computer-implemented methods, computer program products, and system components as illustrated in FIGS. 1-4.

FIG. 5 depicts a block diagram of a computing environment 500 including a computing device 510 operable to support embodiments of computer-implemented methods, computer program products, and system components according to the present disclosure. In an illustrative embodiment, the computing device 510 may include the computer system 110 of FIG. 1, the computing devices 150, 160 of FIG. 1, the storage devices 152, 162 of FIG. 1, the servers 240, 250 of FIG. 2, or components thereof. Each component of the computer system 110 of FIG. 1, the computing devices 150, 160 of FIG. 1, the storage devices 152, 162 of FIG. 1, or the servers 240, 250 of FIG. 2 may include or be implemented using the computing device 510 or a portion thereof.

The computing device 510 includes at least one processor 520 and a system memory 530. Depending on the configuration and type of computing device, the system memory 530 may be volatile (such as random access memory or "RAM"), non-volatile (such as read-only memory or "ROM," flash memory, and similar memory devices that maintain stored data even when power is not provided), or some combination of the two. The system memory 530 typically includes an operating system 532, one or more application platforms 534, one or more applications (e.g., a WBEM application 536), and program data 538. In an illustrative embodiment, the WBEM application 536 is the application 120 of FIG. 1 or the application 210 of FIG. 2. The system memory 530 may also include a technology abstraction library 537. In an illustrative embodiment, the technology abstraction library 537 is the technology abstraction library 126 of FIG. 1 or the technology abstraction library 230 of FIG. 2.

The computing device 510 may also have additional features or functionality. For example, the computing device 510 may also include removable and/or non-removable additional data storage devices, such as magnetic disks, optical disks, tape, or flash memory cards. Such additional storage is illustrated in FIG. 5 by removable storage 540 and non-removable storage 550. Computer storage media may include volatile and/or non-volatile storage and removable and/or non-removable media implemented in any technology for storage of information, such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 510. Any such computer storage media may be part of the computing device 510.

The computing device 510 may also have input device(s) 560, such as a keyboard, mouse, pen, voice input device, touch input device, etc. Output device(s) 570, such as a display, speakers, printer, etc. may also be included. The computing device 510 also contains one or more communication connections 580 that allow the computing device 510 to communicate with other computing devices 590 over a wired or a wireless network. In an illustrative embodiment, the wired or wireless network is the network 140 of FIG. 1. For example, the one or more communication connections 580 may enable communication with a CIM-XML server 592 and a WMI server 594. In an illustrative embodiment, the CIM-XML server 592 is the CIM-XML server 240 of FIG. 2 and the WMI server 594 is the WMI server 250 of FIG. 2.

It will be appreciated that not all of the components or devices illustrated in FIG. 5 or otherwise described in the previous paragraphs are necessary to support embodiments as herein described. For example, the removable storage 540 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer system, comprising:
   a processor; and
   a memory coupled to the processor, the memory storing a management application executable by the processor to:
   generate technology-agnostic management commands to manage a plurality of computing devices, wherein the plurality of computing devices includes a first computing device associated with a first management protocol and a second computing device associated with a second management protocol that is different from the first management protocol; and use a technology abstraction library configured to generate one or more classes that are executable to translate the technology-agnostic management commands to the first management protocol and to the second management protocol where the translation of the technology-agnostic management commands to the first management protocol is generated directly from the technology-agnostic commands and is generated independently of the second management protocol, and where the translation of the technology-agnostic management commands to the second management protocol is generated directly from the technology-agnostic management commands and is generated independently of the first management protocol, wherein the first management protocol is a common information model extensible markup language (CIM-XML) protocol, the second management protocol is a windows management instrumentation (WMI) protocol, and the technology abstraction library comprises a CIM-XML dynamic object configured to communicate with CIM-XML servers via hypertext transfer protocol (HTTP) and a WMI dynamic object configured to communicate with WMI servers via component object model (COM) or distributed COM (DCOM) and comprise one or more C++ classes configured to translate to COM, DCOM, XML, or any combination thereof.

2. The computer system of claim 1, wherein the management application is a web-based enterprise management (WBEM) client and wherein the technology-agnostic management commands are WBEM commands.

3. The computer system of claim 2, wherein the WBEM commands comprise a connect command, an enumerate command, an associate command, or any combination thereof.

4. The computer system of claim 1, wherein the management application comprises user code.

5. The computer system of claim 1, wherein the management application comprises a storage service configured to manage one or more storage area networks (SAN).

6. The computer system of claim 1, wherein the one or more C++ classes are defined by one or more header files that are generated based on run-time type information associated with one or more managed object format (MOF) files.

7. The computer system of claim 6, wherein the one or more MOF files comprise class declarations associated with the one or more computing devices, instance declarations associated with the one or more computing devices, or any combination thereof.

8. The computer system of claim 1, wherein at least one of the plurality of computing devices is remote to the computer system.

9. A computer-readable storage device medium comprising instructions, that when executed by a computer, cause the computer to:

load a technology abstraction library configured to generate one or more classes comprising one or more C++ classes, the one or more classes executable to translate web-based enterprise management (WBEM) commands to a first management protocol and to a second management protocol that is different from the first management protocol;

during execution of a technology-agnostic management application, generate a WBEM command;

translate, via the technology abstraction library, the WBEM command to the first management protocol to generate a first translated WBEM command;

transmit the first translated WBEM command to a first storage device;

translate, via the technology abstraction library, the WBEM command to the second management protocol to generate a second translated WBEM command; and transmit the second translated WBEM command to a second storage device, wherein the first translated WBEM command is generated directly from the WBEM command and is generated independently of the second management protocol second translated WBEM command is generated directly from the WBEM command and is generated independently of the first management protocol.

10. The computer-readable storage device of claim 9, wherein the first management protocol comprises CIM-XML and the second management protocol comprises WMI, and wherein the technology abstraction library comprises a CIM-XML dynamic object configured to communicate with CIM-XML servers via hypertext transfer protocol (HTTP) and a WMI dynamic object configured to communicate with WMI servers via component object model (COM) or distributed COM (DCOM).

11. The computer-readable storage device of claim 9, wherein the first management protocol is a common information model extensible markup language (CIM-XML) protocol.

12. The computer-readable storage device of claim 9, wherein the second management protocol is a windows management instrumentation (WMI) protocol.

13. A method, comprising:

at a computer, performing operations including:

generating one or more classes based on one or more managed object format (MOF) files associated with one or more computing devices, the MOF files comprising run-time type information associated with the one or more computing devices;

binding a technology-agnostic WBEM command to one or more common information model extensible markup language (CIM-XML) commands corresponding to the WBEM command;

binding the technology-agnostic WBEM command to one or more windows management instrumentation (WMI) commands corresponding to the WBEM command; and wherein the binding of the technology-agnostic WBEM command to the one or more CIM-XML commands is generated directly from the WBEM command and is generated independently of the one or more WMI commands and the binding of the technology-agnostic WBEM command to the one or more WMI commands is generated directly from the WBEM command and is generated independently of the one or more CIM-XML commands.

14. The method of claim 13, wherein the one or more classes are C++ classes associated with C++ header files.

15. The method of claim 13, wherein the CIM-XML commands are configured to communicate with CIM-XML servers via hypertext transfer protocol (HTTP) and the WMI commands are configured to communicate with WMI servers via component object model (COM) or distributed COM (DCOM).

16. The method of claim 15, wherein at least one of the CIM-XML servers and the WMI servers is remote to the processor.

17. The method of claim 16, wherein one or more of the WBEM commands are sent to a management server.

18. The method of claim 17 wherein the management server manages one or more storage area networks (SANs).

19. The method of claim 13, wherein the WBEM commands comprise a connect command, an enumerate command, an associate command, or any combination thereof.

20. The method of claim 13, wherein the one or more MOF files comprise class declarations associated with the one or more computing devices, instance declarations associated with the one or more computing devices, or any combination thereof.

\* \* \* \* \*